United States Patent
Szymanski et al.

(10) Patent No.: US 8,960,523 B2
(45) Date of Patent: Feb. 24, 2015

(54) FRICTION STIR WELDING OF DISSIMILAR METALS

(75) Inventors: Robert T. Szymanski, St. Clair Township, MI (US); Sri Krishna Chimbli, Houston, TX (US); Mark T. Hall, Troy, MI (US); Yen-Lung Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/110,195

(22) Filed: May 18, 2011

(65) Prior Publication Data

US 2011/0214799 A1 Sep. 8, 2011

Related U.S. Application Data

(60) Division of application No. 12/418,663, filed on Apr. 6, 2009, now Pat. No. 7,997,472, which is a continuation-in-part of application No. 12/250,750, filed on Oct. 14, 2008.

(51) Int. Cl.
*B23K 20/12* (2006.01)
*B23K 35/12* (2006.01)
*B23K 20/233* (2006.01)

(52) U.S. Cl.
CPC .......... *B23K 20/1265* (2013.01); *B23K 20/122* (2013.01); *B23K 20/126* (2013.01); *B23K 20/128* (2013.01); *B23K 20/2333* (2013.01);
(Continued)

(58) Field of Classification Search
None
See application file for complete search history.

(56) References Cited

U.S. PATENT DOCUMENTS 5,211,910 A 5/1993 Pickens et al.
6,543,670 B2 4/2003 Mahoney
(Continued)

FOREIGN PATENT DOCUMENTS

DE 102005029882 A1 12/2006
DE 202005021318 U1 9/2007
(Continued)

OTHER PUBLICATIONS

Chen et al., "Diffusion and Formation of Intermetallic Compounds during Accumulative Roll-Bonding of Al/Mg Alloys", Materials Transactions, vol. 48, No. 10 (2007) pp. 2595 to 2598.*
(Continued)

*Primary Examiner* — Devang R Patel
*Assistant Examiner* — Carlos Gamino
(74) *Attorney, Agent, or Firm* — Reising Ethington P.C.

(57) ABSTRACT

When a friction stir weld tool penetrates the interface of two workpieces of dissimilar metal alloy materials, the resultant weld of the different alloy materials may produce a weak weld joint. Such weak joints are often experienced, for example, when attempting to form spot welds or other friction stir welds between a magnesium alloy sheet or strip and an aluminum alloy sheet or strip. It is discovered that suitable coating compositions including an adhesive placed at the interface of assembled workpieces can alter the composition of the friction stir weld material and strengthen the resulting bond. In the example of friction stir welds between magnesium alloy and aluminum alloy workpieces, it is found that combinations of an adhesive with copper, tin, zinc, and/or other powders can strengthen the magnesium-containing and aluminum-containing friction stir weld material.

5 Claims, 3 Drawing Sheets

(52) U.S. Cl.
CPC ......... *B23K 2203/08* (2013.01); *B23K 2203/10* (2013.01); *B23K 2203/18* (2013.01)
USPC ...................................... 228/112.1; 228/245

(56) References Cited

U.S. PATENT DOCUMENTS

| | | | |
|---|---|---|---|
| 7,240,821 B2 * | 7/2007 | Talwar | 228/175 |
| 8,186,567 B2 * | 5/2012 | Talwar | 228/175 |
| 2002/0158109 A1 | 10/2002 | Gendoh et al. | |
| 2006/0289604 A1 | 12/2006 | Zettler | |
| 2008/0099533 A1 | 5/2008 | Hanlon et al. | |
| 2009/0001141 A1 * | 1/2009 | Spriestersbach et al. | 228/223 |

FOREIGN PATENT DOCUMENTS

| | | | |
|---|---|---|---|
| EP | 1749616 A1 | * | 2/2007 |
| JP | 2005040851 A | * | 2/2005 |

OTHER PUBLICATIONS

Zhao et al.; Effect of Zn alloy interlayer on interface microstructure and strength of diffusion-bonded Mg—Al joints; Elsevier; Scripta Materialia 58 (2008) 283-286.

Sato et al; Constitutional liquation during dissimilar friction stir welding of Al and Mg alloys; Elsevier; Scripta Materialia 50 (2004) 1233-1236.

* cited by examiner

FRICTION STIR WELDING OF DISSIMILAR METALS

This application is a division of U.S. patent application Ser. No. 12/418,663, filed on Apr. 6, 2009, and titled "Friction Stir Welding Using an Adhesive, Copper, Tin and Zinc Interlayer", which is a continuation-in-part of U.S. patent application Ser. No. 12/250,750 filed on Oct. 14, 2008, and titled "Friction Stir Welding of Dissimilar Metals."

TECHNICAL FIELD

This invention pertains to the use of friction stir welding in joining dissimilar metal members, such as a magnesium alloy panel and an aluminum alloy reinforcing piece. More specifically, this invention pertains to the placement of an interlayer material such as a mixture of adhesive and metallic powder between facing surfaces of the different metal composition members for incorporation into the joint material produced by the friction stir weld tool to increase the strength of the welded joint.

BACKGROUND OF THE INVENTION

There are manufacturing applications in which it could be useful to weld members of dissimilar metal compositions to fabricate, for example, relatively light-weight articles. For example, in the manufacture of automotive vehicle body parts it might be desired to bond an aluminum alloy reinforcing strut to a magnesium alloy panel. Often, such dissimilar metal members are difficult to join by conventional joining techniques such as fusion welding processes because they form massive, brittle intermetallic compositions that weaken the joint. It is contemplated that such dissimilar metal parts might be joined using friction stir welding practices.

In friction stir welding a rotating tool with an axial probe and shoulder is pressed into a surface of an assembly of metal workpieces. The rotating probe and shoulder engage the workpieces at a welding site. The frictional heat and continued pressure on the probe and shoulder temporarily soften, plasticize, and mix material in engaged portions of the workpieces. When the rotating tool is pressed generally perpendicularly into a spot on the workpieces and then retracted, a friction stir spot weld is formed. The friction stir tool may be retracted and moved and successively engaged along the surface of one or more workpieces to form a series of friction stir spot welds. When the rotating tool is pressed into a workpiece surface and moved in the surface, a friction stir linear weld or seam weld may be formed. Similarly, the friction stir tool may be moved along an interface of abutting edges of two or more workpieces to form a friction stir butt weld. Collectively, these various weld patterns are referred to as friction stir welding (FSW). FSW may include friction stir spot welding (FSSW).

Where the composition of the metal pieces to be joined yields a suitable weld zone, good joint strengths may be obtained. When some dissimilar metals are joined with FSW, the formation of brittle, low melting point intermetallic materials in the weld zone may yield weak or brittle weld bonds. This may happen when, for example, it is desired to join a magnesium alloy member to an aluminum alloy part.

It is an object of this invention to provide a method of achieving strong friction stir weld bonds between workpieces of dissimilar metal compositions such as, for example, between magnesium alloy workpieces and aluminum alloy workpieces.

SUMMARY OF THE INVENTION

Practices of this invention are useful in friction stir welding situations in which dissimilar metal workpieces are to be joined and the respective compositions of the workpieces fail to yield good bond strengths by conventional friction stir welding techniques. For example, friction stir plasticized aluminum and magnesium alloys may form a low melting temperature composition that weakens an intended weld. During friction stir welding of aluminum to magnesium, the temperature of the weld site may be high enough to produce a low melting Al—Mg eutectic liquid. This liquid not only limits the size of the stir zone but also tends to stick to the friction stir welding tool when the tool is withdrawn from the weld site. The formation of such a liquid material produces a weak bond between the aluminum and magnesium work pieces.

The joint strength of a friction stir spot weld depends on the size of its stir zone that was formed during welding. When friction stir plasticization of an interface comprising elements of two dissimilar metal members fails to produce a good friction stir bond, it may be beneficial to change the composition of the friction stirred zone by adding one or more interlayer materials comprising, for example, an adhesive mixed with metal powders and/or non-metal powders at interface(s) of the workpieces to be joined.

The adhesive may be used as a vehicle for the metal and/or non-metal powder to be applied to the joint for FSW. The adhesive may incorporate the metal and/or non-metal powder and provide better adherence of the powders to surfaces that will be subjected to FSW. The adhesive and powder mixture may be applied at and/or around the weld site. In addition, the adhesive that is not burned off during the FSW process may be cured during the manufacturing process, increasing the strength of the joint, for example from about 750 lb to about 1500 lb lap shear strength. This additional strength may arise from the additional bonding area created by the adhesive. In one embodiment, the adhesive under and/or adjacent the FSSW pin tool will burn off leaving the powder to react with the parent metals. Adhesive remote from the pin tool will cure at some point in the manufacturing process, adding strength to the joint.

In embodiments of the invention where an aluminum member is to be joined to a magnesium member, intended weld sites may be provided with a layer including a mixture of (a) adhesive and copper and tin powders, or (b) adhesive and copper, tin and zinc powders, or (c) adhesive and zinc powder, or (d) adhesive and other suitable metallic and/or non-metallic powder compositions and mixtures comprising, for example but not limited to, at least one of aluminum, magnesium, silicon, strontium, cerium (or other lanthanoids), silver, titanium, antimony, nickel, chromium, manganese, iron, vanadium, niobium, zirconium, yttrium, molybdenum, tungsten, brass, bronze, steels, carbon, alumina, magnesia, silica, titanium oxide or iron oxides, or combinations thereof. Examples of adhesives that may be used in the mixture include, but are not limited to, at least one of epoxies, polyurethanes, acrylics, tape adhesive, or spray adhesives. The adhesive may be in any suitable form, for example but not limited to a liquid, spray, mist, paste, or particles.

The adhesive and the metal powders may be added in separate layers of a single component or as a layer of multi-component mixture. Such a composition is applied as a suitable coating or interlayer to interfacial surfaces of the parts to be welded. Then the parts are assembled and supported for friction stir welding. These coatings may also be applied onto the top surface of the workpiece facing the friction stir welding tool. During the welding, the added materials are stirred, mixed, and may react with adjacent aluminum and magnesium in the stir-affected zone. The resulting, more complex mixture forms a stronger weld bond. The coating may also improve corrosion properties of the weld joint.

Such adhesive and powder compositions are chosen by experience or experiment for improving the mechanical properties of the FSW. For example, the adhesive and powder composition may react with the parent metals (e.g., aluminum alloy and magnesium alloy) to form constituents of higher melting temperatures (higher than those of the constituents that may form from the parent metal interactions alone) in the stir zone or increase the viscosity of the intermetallic liquid produced such that the stir zone becomes relatively solid or firm and decreases its tendency to stick to the weld tool. After welding, any remaining adhesive may cure and strengthen the bond between the adjacent workpieces. The added powder materials may react with the parent metals to form other microstructural constituents. The curing of the adhesive and an increase in melting temperature of the stir zone material and/or an increase in the stir zone firmness with a dispersion of small particles of added powder material and/or reaction products may increase the strength and/or toughness of the resulting joint between the dissimilar metal workpieces.

In another embodiment of the invention that is complementary to the use of interface-composition changing powders, a high thermal conductivity anvil is used to support the workpieces against the friction stir tool and to promote heat transfer from the stir zone to minimize formation of low melting point intermetallic materials during friction stir welding. The increased cooling rate is used to avoid or minimize melting in the weld region. The increased cooling rate is used to minimize the amount formed of low melting temperature intermetallic materials and to increase the firmness of the resultant mixture of metals and intermetallic liquid.

As stated above, the composition-changing powder material may be developed and specified by experience or experiment. For example, the temperature in the stir zone during friction stir welding of aluminum and magnesium workpieces can easily be 450° C. and above. Tin and zinc have relatively low melting temperatures, approximately 232° C. and 420° C., respectively. Therefore, during friction stir welding, tin and zinc are melted and the tin or zinc liquid can react with the adjacent aluminum and magnesium materials. For example, tin can react with magnesium to form a mixture of solid $Mg_2Sn$ (melting temperature of about 770.5° C.) particles and tin-rich Mg—Sn liquid during friction stir welding. And the adhesive that is not burned off during the FSW process cures and contributes to the bond between the aluminum and magnesium workpieces. In the meantime, aluminum and magnesium can form an Al—Mg eutectic liquid. The $Mg_2Sn$ particles thus formed and the added particles such as copper particles along with the inclusion particles that existed within the parent materials mix with the Al—Mg eutectic liquid to decrease its fluidity and increase its firmness. This mixture further mixes with the un-reacted aluminum and magnesium parent materials in the stir-affected zone resulting in a relatively firm and strong stir zone. This firmness also decreased the tendency for the stir zone material to stick to the weld tool. Upon cooling, a strong and tough weld is formed of a complicated composite of aluminum alloy, magnesium alloy, $Mg_2Sn$, Al—Mg intermetallic compound like $Al_3Mg_2$, and copper. It may also contain some tin.

In one embodiment, the interlayer material composition is used in the form of a powder or the like to facilitate adhesive bonding and dispersion in, and alloying with, the friction stir tool plasticized metal from the adjacent facing workpieces. The supplemental coating material is applied to the contacting regions of overlapping or abutting workpieces of different metal compositions. The coating material may be placed as loose powder on facing surfaces of one or both of the pieces before they are assembled and supported for FSW. The addition of interlayer material may be done by any suitable coating method like cold spray, electron beam vacuum deposition, thermal spray, etc., or by cladding or simply by adding a thin piece of material of suitable composition, in addition to application as loose powders.

Other objects and advantages of the invention will be apparent from a detailed description of various embodiments of the invention.

DESCRIPTION OF PREFERRED EMBODIMENTS

Figure 1:
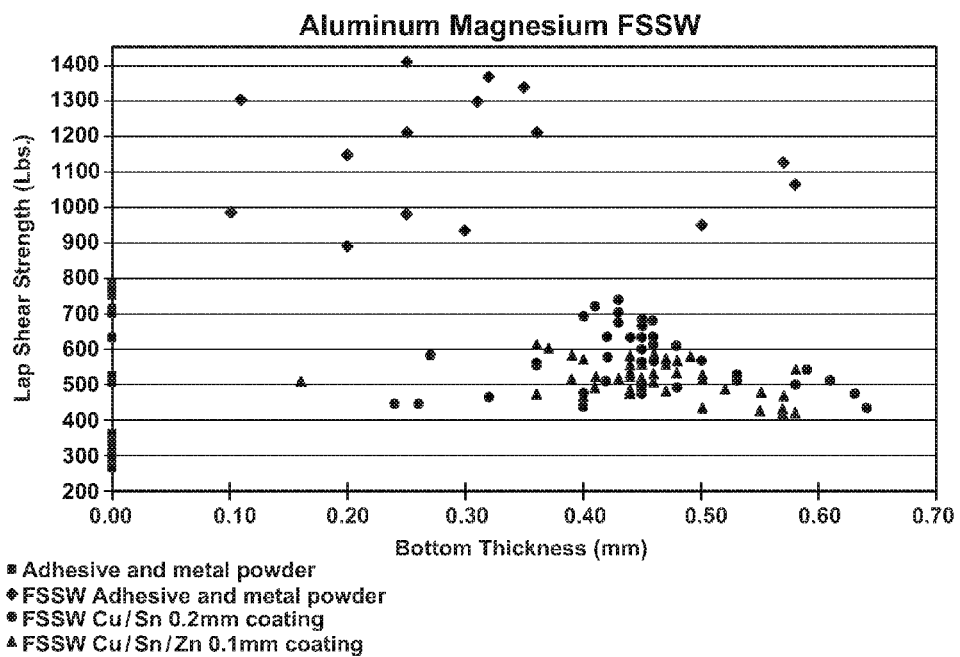
FIG. 1 is a graph showing the lap shear strength of FSSW joints with interlayer compositions of adhesive-metal powder mixtures and metal powders without adhesive.

Friction stir welding of dissimilar metals, for example aluminum alloy to magnesium alloy workpieces, often causes the formation of a fairly large amount of brittle, low melting point intermetallic phases, which is undesirable for attaining high joint strengths. Melting in FSW operations may cause the stir zone material to stick to the pin tool and thereby only low joint strengths are achieved.

In various examples, friction stir spot welding of 1.6 mm thick, AA5754 aluminum alloy strips to 1.3 mm thick, AZ31 magnesium alloy strips was conducted. The pieces were supported on a steel anvil. A friction stir tool having a probe height of about 2.4 mm, a probe diameter of about 3 mm and a tool shoulder diameter of about 10 mm was rotated at a speed of 1600 rpm and applied to the aluminum surface at a force of about 8 kN. The probe had a threaded external surface. The probe penetrated through the aluminum strip and into the magnesium strip. The plasticized spot weld was formed in a few seconds and the tool and probe retracted. After a spot weld was formed the sheets were subjected to a shear load to test the strength provided to the joined pieces by the single spot weld. A lap shear strength value of only about ninety pounds was obtained. While the melting points of the respective strips were above 600° C., magnesium and aluminum are known to form eutectic compositions that melt more than 150° C. lower. It appears that such brittle, low melting point compositions formed during friction stir welding and led to the weakness of the spot weld.

It has been found that much higher spot weld strength values can be obtained by introducing, for example, a mixture of copper and tin powder particles, or a mixture of copper, tin, and zinc powders, or zinc particles between the aluminum and magnesium work pieces. These mixtures may also improve corrosion properties of the weld joint. The addition of an adhesive to the powder particles further increases the spot weld strength values. The adhesive provides a vehicle for applying the powders to the joint to be welded. The portion of the adhesive that is not burned off during welding forms an adhesively bonded joint. The addition of the adhesive thus may increase the total joint from about 700 lb to about 1500 lb.

Lap shear strength of the friction stir spot welded joints of 1.6 mm AA5754 aluminum to 1.3 mm AZ31 magnesium using copper-tin powder interlayer materials, with copper weight fraction varying from 0.1 to 0.9, was improved to 200 to 450 lb from about 90 lb for those welds without the copper-tin interlayers. The powder mixture with a copper fraction of 0.25 gave the 450 lb lap shear strength. In another embodiment where a strip of 1.3 mm AZ31 magnesium sheet (placed on the top, i.e., on the tool side) is friction stir spot welded to a strip of 2.5 mm AA5754 sheet with a steel anvil, a lap shear strength of about 200 lb was obtained without any coating additions.

With the use of an interlayer of zinc powder, a lap shear strength of about 420 lb was obtained. With the use of an interlayer of adhesive and 25 wt % Cu, 75 wt % Sn metal powder, along with a copper anvil, a lap shear strength of as high as 1500 lb was obtained for a 1.6 mm AA5754 aluminum strip welded to a 1.3 mm AZ31 magnesium strip. FSW joints made with the adhesive and metal powder mixture resulted in a 20-50% increase in strength when compared to joints made with addition of the metal powders only without the adhesive.

In other trials, friction stir spot welds were formed on overlapping aluminum and magnesium strips while they were supported on a high thermal conductivity copper anvil. The high thermal conductivity anvil was sized and shaped for quickly conducting excess heat (causing melting) from the friction stir spot weld region of the lower of the workpieces which was pressed against the copper anvil. Three metal powder compositions comprising, by weight, one part copper to three parts tin, one part each of copper, tin, and zinc (designated hereinafter as copper-tin-zinc), and 100% zinc were found to markedly increase the lap shear strength of a friction stir spot weld formed between the aluminum and magnesium alloy strips.

In a series of tests, coatings of mixed copper, tin, and zinc particles were applied to the aluminum strips by a cold spray coating procedure to a thickness of about 0.2 mm Cold spray may be performed by using a supersonic carrier gas to propel metal powders toward the substrate to be coated. The high speed particles impact the substrate and deform into a dense and adherent coating. The gas temperature in the spray nozzle is below the melting temperature of the particles. With the complementary use of a copper anvil, lap shear joint strengths above 750 lb were obtained for FSSW joints of the 1.6 mm thick, AA5754 aluminum to 1.3 mm thick, AZ31 magnesium. For example, the coating addition of one part each of copper, tin, and zinc gave an average lap shear strength of 600 lb, 100% zinc, 650 lb, and one part copper to three parts tin, 750 lb. The use of a copper anvil and/or water-cooled anvil, for example a water-cooled steel anvil, reduces the temperature of the stir zone during welding by dissipating excess generated heat and helps to maintain a solid or relatively firm stir zone.

FSSW trials also were conducted with copper-anvil supported 1.6 mm thick AA5754 aluminum to 1.3 mm thick AZ31 magnesium using other powder mixtures, such as 10Cu-90Sn (500 lb), 25Ag-75Sn (500 lb), 25Ag-65Sn-10Zn (615 lb), Zn (650 lb), 10C-90Sn (500 lb), $Al_2O_3$ (550 lb), and 50Al-50$Al_2O_3$ (606 lb) (where the compositions are given in weight percent), compared with a lap shear strength of up to 250 lb without the addition of any coating or powder mixtures. The compositions are indicated in weight percentage with the average lap shear strengths given in the parentheses following each powder mixture. There are other powder mixtures that also improved joint strength significantly, e.g., an $Al_2O_3$ and 25 wt % Cu-75 wt % Sn powder mixture (approximately equal volume fractions) gave an average lap shear strength of 695 lb. The powder additions can also be made to the top surface (i.e., on the friction stir tool side) or top surface and faying surfaces. For example, a FSSW of 1.3 mm AZ31 sheet to a 2.5 mm AA5754 aluminum sheet with aluminum powders on top of the AZ 31 sheet and copper-tin-zinc powders at faying surfaces gave a lap shear strength of 580 lb.

FSSW trials were also performed with copper-anvil supported 1.6 mm thick AA5754 aluminum to 1.3 mm thick AZ31 magnesium using interlayer compositions with and without adhesive. FIG. 1 shows the lap shear strength of the FSSW joints from these trials and of a joint bonded without FSSW versus bottom thickness (in millimeters), the final depth of the welds. The diamond data points are for FSSW joints with adhesive and metal-powder mixture. The circle data points are for FSSW joints with a 25 wt % Cu-75 wt % Sn coating applied by the cold spray coating procedure to a thickness of about 0.2 mm. The triangle data points are for FSSW joints with a Cu—Sn—Zn (equal weight percentage) coating applied by the cold spray coating procedure to a thickness of about 0.1 mm. The square data points are for joints bonded without FSSW operation where adhesive and metal-powder mixture was applied to the joints. As evidenced by the diamond data points, the addition of the adhesive significantly increases the strength of the FSSW joint. This is because the adhesive that is not burned off during the FSSW process cures and increases the joint strength.

Further practices of friction stir welding with powder coatings will be described.

Figure 2:
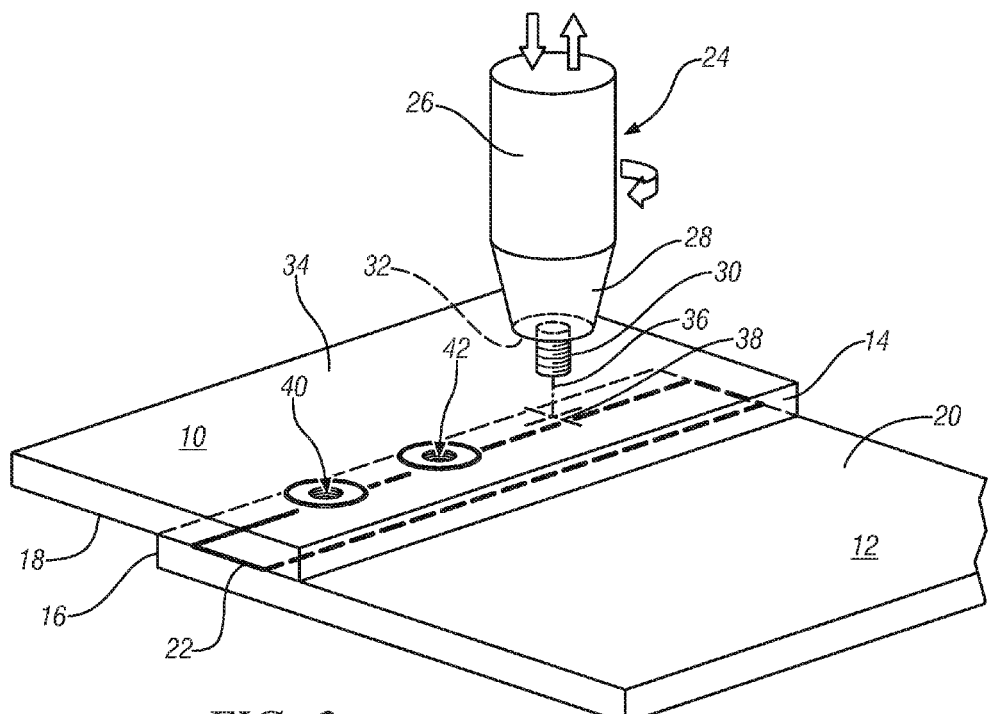
FIG. 2 illustrates the formation of an in-line sequence of friction stir spot welds in the surface of overlapping edges of, for example, a first metal alloy workpiece with a second metal alloy workpiece. A friction stir weld tool is illustrated in a withdrawn position poised for the formation of a third spot weld. A coating of mixed adhesive and powdered material has been placed between the overlapping surfaces along the path of intended spot welds.

In FIG. 2, an edge 14 of a strip 10 (or sheet or plate or other workpiece shape) of a first metal composition overlaps an edge 16 of a second strip 12 (or sheet or plate or other workpiece shape) of a second metal composition. By way of illustration, the first metal composition may be an aluminum alloy and the second metal composition may be a magnesium alloy. Lower face 18 of upper strip 10 lies against upper face 20 of strip 12. In this embodiment the overlapping edges 14, 16 of the respective strips are parallel and it is intended to form a series of friction stir spot welds in a line between the parallel edges 14, 16. A coating layer or interlayer composition 22 of a composition predetermined to improve the strength of the spot welds was applied to a surface of at least one of the strips 10, 12 before they were assembled in the illustrated overlapping position. In this example, coating layer 22 is applied in a generally rectangular strip (solid edge and dashed lines in FIG. 2) between the facing surfaces 18, 20 of sheets 10, 12. Coating layer 22 extends along the path of the intended spot welds. The interlayer composition 22 may include adhesive and metallic and/or non-metallic powder compositions or mixtures. In an embodiment in which the metal parts are formed respectively of a magnesium alloy and an aluminum alloy, interlayer compositions such as those described above may be used in the coatings.

Figure 6:
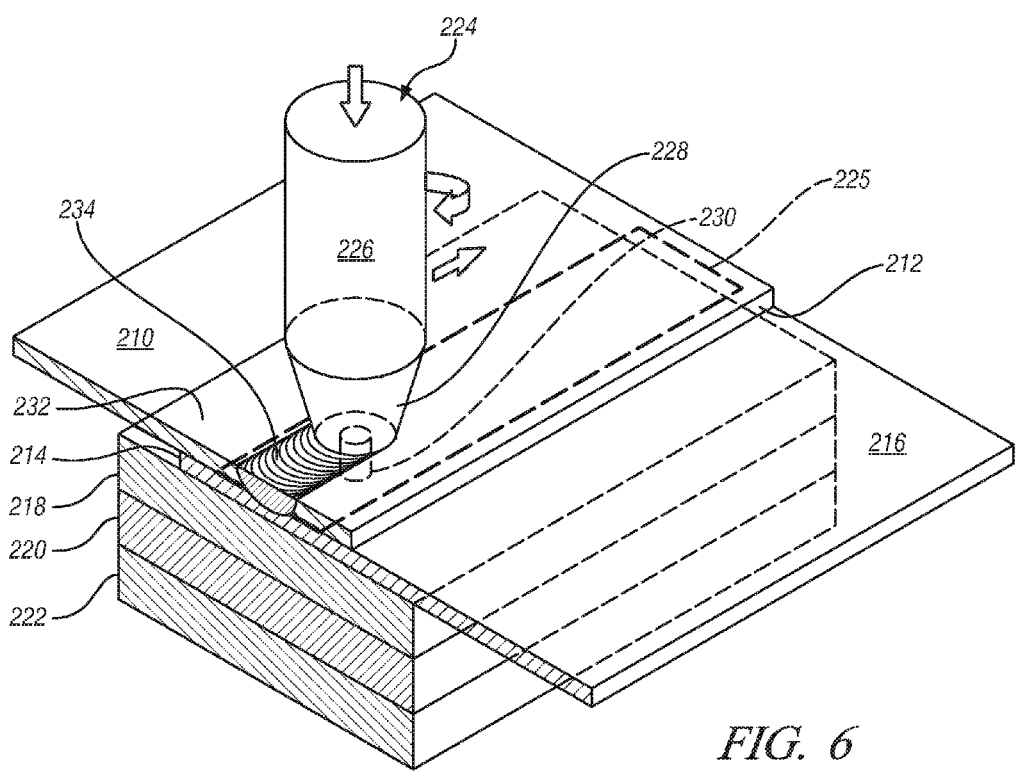
FIG. 6 illustrates friction stir welding of overlapped sheets of different base alloy compositions with a thin interlayer of adhesive and metal powders placed between the metal sheets along the weld path.

The overlapping strips 10, 12 are assembled and supported against the applied force of a friction stir tool 24. In various embodiments of the invention, the workpieces 10, 12 are supported on a high thermal conductivity anvil as is illustrated in FIG. 6 and described more fully in connection with that figure. The supporting anvil is not illustrated in FIG. 2. Friction stir tool 24 has a round cylindrical body 26 merged with a concentric truncated conical tip 28 and a threaded axial probe 30. The probe may also be conical in shape. The threads on probe 30 may be replaced by stepped spirals or other suitable profiles that promote friction stirring and the formation of a strong weld. The bottom face of truncated conical tip provides an annular shoulder 32 from which the axial-extending probe 30 extends. The probe 30 and shoulder 32 are rotated and pressed into engagement with a predetermined friction stir contacting surface of workpieces in friction stir welding. As is known, shoulder 32 and probe 30 can be separately actuated and rotate at different speeds, the mechanisms of which are not described herein. In the embodiment illustrated in FIG. 2, spot welding sites on upper surface 34 of workpiece strip 10 are the designated contact regions for probe 30 and shoulder 32 of friction stir tool 24.

In friction stir welding operations, friction stir tool 24 is securely held in a powered friction stir machine, not illustrated, that is adapted to locate the tool probe 30 and annular shoulder 32 against one or more surfaces of a workpiece or workpieces. In FIG. 2 friction stir tool 24 is positioned in an attitude with the rotational axis 36 of the tool, including probe 30, aligned generally perpendicular to a spot weld site (indicated by cross-mark 38 in FIG. 2). The friction stir machine is adapted to rotate friction stir tool 24 as indicated by the rotational arrow. The friction stir machine forcefully advances the tool (lowers the tool in FIG. 2 per downward directional arrow) so that the rotating probe 30 and shoulder 32 first engage surface 34 of strip 10, and penetrate through strip 10 into strip 12. As will be described more fully with respect to FIG. 3, the frictional contact between the rotating probe 30 and shoulder 32 and the materials of the respective workpieces generates intense local heating. The engaged material is plasticized. After a brief period of such friction stirring, the tool 24 is temporarily retracted from contact with the workpieces. The plasticized or stirred metal hardens to form a spot weld (e.g., spot weld sites 40, 42 in FIG. 2), and tool 24 advances to a next friction stir spot weld position, such as over site 38. Spot weld sites 40 and 42 reflect the penetration of threaded probe 30 and engagement of the surface 34 of strip 10 with the shoulder 32 of tool 24. In this example the rotational speed of tool 24 is 1600 rpm as it is pressed into the workpieces with a force of 8 kN. The probe may penetrate about 2.5 mm through strip 10 and into strip 12.

Figure 3:
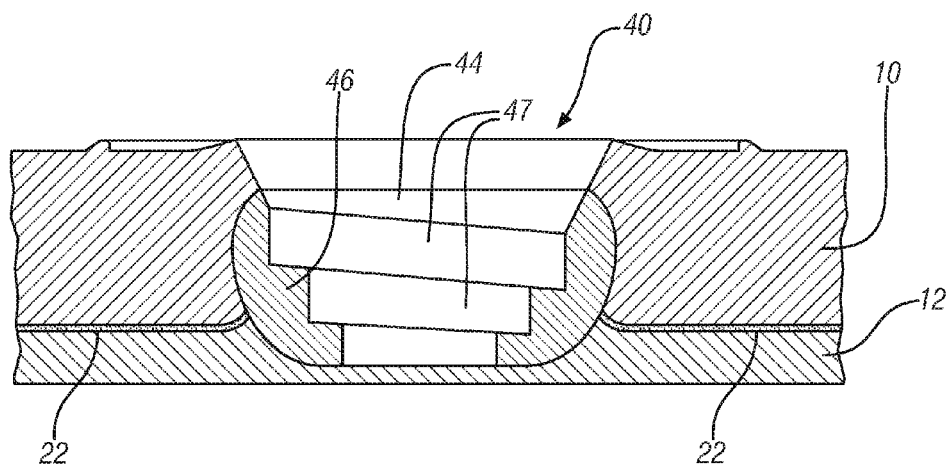
FIG. 3 illustrates a cross-sectional view of a single spot weld and adjacent region formed in the FIG. 2 assembly, showing the deformed regions of the first and second metal alloy pieces with the stir zone and nearby coating material.

FIG. 3 is a schematic (and not necessarily to scale), cross-sectional view of a friction stir spot weld site, such as the region of friction stir spot weld site 40, in FIG. 2. In FIG. 3, fragmentary portions of upper strip 10 and lower strip 12 are seen. Generally conical hole 44 remains at the spot weld site after the upward extraction of tool 24 which lifts probe 30 and shoulder 32 from their penetration into the workpieces. Hole 44 extends through the affected portion of strip 10 and through about 50% or more of the thickness of strip 12. In the case of this spot weld, an annular mass of hardened stirred material 46 locally joins strips 10, 12 in the spot weld. Stepped spiral indentations 47 from probe 30 are seen in the stirred material 46. A thin layer of unconsumed interlayer composition 22, which may include adhesive that has been cured during the manufacturing process, is seen surrounding the spot weld site 40. The interface between strips 10 and 12 is deformed by the spot weld as seen by the upper curvature of the interlayer composition 22 adjacent the hardened weld material 46. The hardened stirred material 46 includes materials from strip 10, strip 12, the applied powder composition 22, and their reacted products, if any.

Thus, in the example where strip 10 is an aluminum alloy, strip 12 is a magnesium alloy, and the coating material comprises adhesive, copper, tin, and/or zinc, the stir zone 46 includes each of magnesium (and some of its alloying constituents), aluminum (and some of its alloying constituents), copper, tin, zinc, and their alloys or compounds (e.g., $Mg_2Sn$, $Al_3Mg_2$) that may be formed during the friction stir process, and any adhesive that was not burned off during the process.

Figure 4:
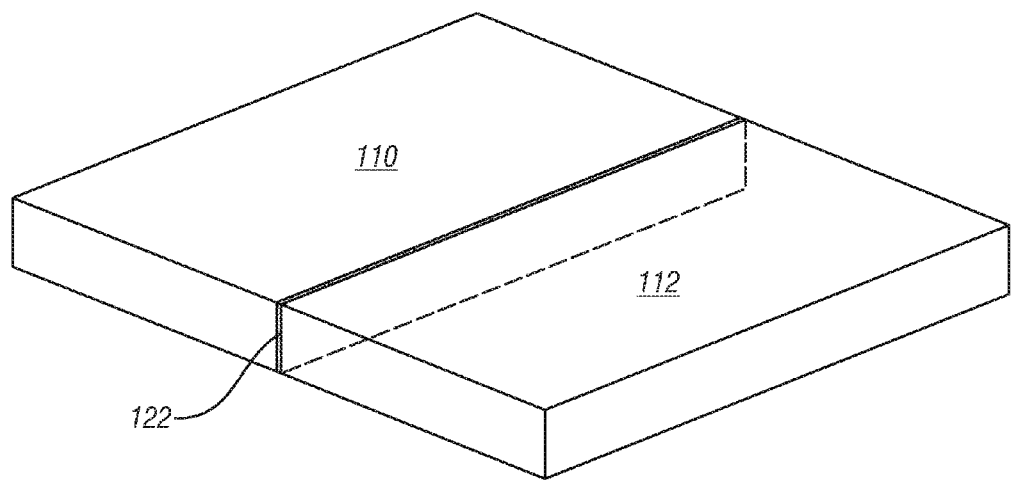
FIG. 4 illustrates abutting pieces of dissimilar metal strips or plates with a layer of coating material of adhesive and alloying powders placed between the abutting surfaces.

FIG. 4 illustrates abutting strips (or plates or other workpiece shapes) 110, 112. Strip 110 is made of a first metal composition and strip 112 is formed of a second and dissimilar metal composition. Strips 110, 112 have complementary, aligned abutting facing edges between which is located a layer 122 of coating material for enhancing the formation of a strong friction stir butt weld along the abutting contact surfaces. The composition of coating layer 122 is predetermined by experience or experiment to provide microstructural constituents to the weld to strengthen the weld joint between the respective dissimilar compositions of strips 110 and 112. The coating layer 122 may include adhesive and/or metallic powders and/or non-metallic powders as described above. The thickness of coating layer 122 may be of the order of a few tenths of a millimeter to a few millimeters or so and determined to provide a suitable quantity of adhesive and alloying elements or strengthening constituents to the butt weld site.

Figure 5:
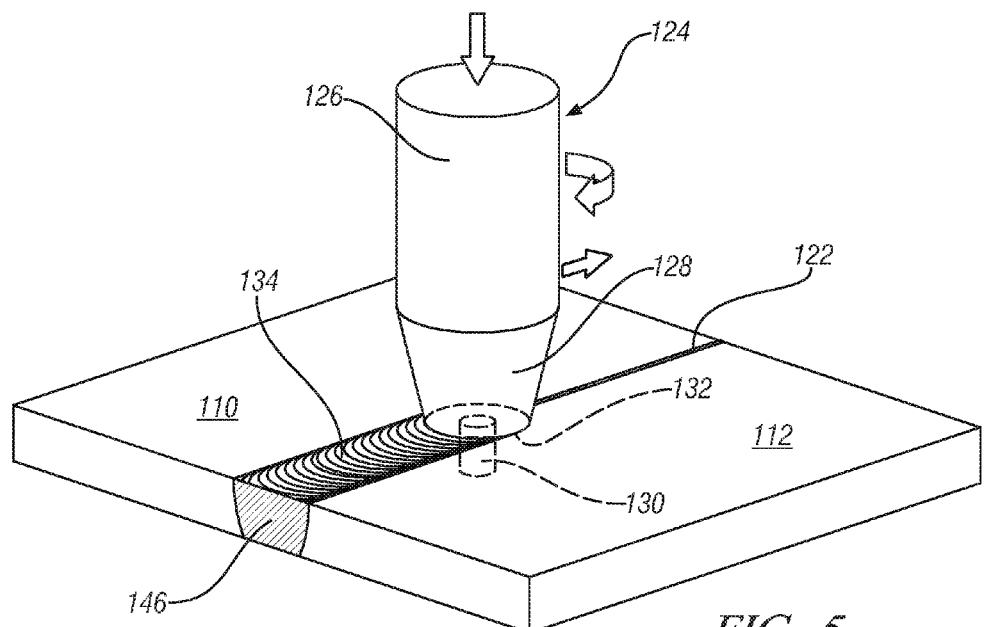
FIG. 5 illustrates a friction stir tool in the process of forming a continuous friction stir butt weld seam between the abutting metal pieces of FIG. 4.

FIG. 5 illustrates the action of a friction stir tool 124 as it is rotated (see rotational directional arrow) and pressed (downward directional arrow) into powder or coating layer 122 and the abutting edges of strips 110 and 112. In this friction stir welding embodiment, rotating tool 124 is plunged into the abutting top surfaces of the workpiece strips 110, 112 at the left side edge (as viewed in FIG. 5) and traversed progressively along their interface (traversing directional arrow pointing to the right). The adjacent dissimilar metal faces and interposed powder or coating layer 122 are stirred and mixed. As friction stir tool 124 advances along the facing workpiece faces a hardened stirred material bead 146 is formed that provides a linear seam weld with weld surface 134 between the abutting strips 110, 112. If a full penetration (through thickness) seam weld cannot be achieved by welding from only one side, then an additional welding operation can be done from the opposite side. A full penetration weld can also be achieved by using a self-reacting pin tool as known in the open literature.

The composition of hardened stirred material bead 146 includes elements of the metal compositions of strip 110, 112 and interfacial coating layer 122, including any adhesive that was not burned off during the FSW process. The combined compositions provide a stronger weld joint between strips 110 and 112 than is obtained without the use of coating composition 122.

FIG. 6 illustrates an embodiment of the invention in which a linear seam weld is formed between overlapping aluminum alloy and magnesium alloy sheets by a friction stir welding process. In this embodiment of the invention, the use of a coating layer of adhesive and supplement powdered alloying elements is complemented with the use of a high thermal conductivity supporting anvil to increase the bond strength of the friction stir weld.

As illustrated in FIG. 6, a first rectangular aluminum alloy sheet 210 has an edge 212 overlying and overlapping edge 214 of a rectangular magnesium alloy sheet 216. The thickness of sheets 210, 216 may often be in the range from about one-half millimeter to about four millimeters; however, the bottom workpiece 216 may be thicker than four millimeters, when a thick plate, extrusion, or casting is to be part of the friction stir weld assembly. In this example, sheets 210, 216 are shown to be of the same thickness and their thickness is somewhat exaggerated to illustrate the friction stir welding process. Also in this example, edges 212 and 214 are parallel and a linear seam weld is to be formed in a line generally parallel to sheet edges 212, 214 and situated in between them.

A coating layer 225 of a composition predetermined to improve the strength of the lap seam weld was applied to a surface of at least one of the sheets 210, 216 before they were assembled in the illustrated overlapping position. In this example, coating layer 225 is applied in a generally rectangular strip (solid edge and dashed lines in FIG. 6) between the facing surfaces of sheets 210, 216. Coating layer 225 extends along the path of the intended linear seam weld. In an embodiment in which the metal parts are formed respectively of an aluminum alloy and a magnesium alloy, the coating layer may include mixtures of adhesive and copper-tin, copper-tin-zinc, zinc, or other compositions such as are described above. In those situations where more than two sheets are to be welded, interlayer materials such as coating layer 225 may be applied to some or all of the faying surfaces. The coating compositions may also be different at different faying surfaces, depending on the compositions of two adjacent parent materials. This situation applies to both linear friction stir welding and friction stir spot welding processes described above.

Referring again to FIG. 6, the portions to be welded of overlapping sheets 210, 216 are placed on a stack of three rectangular copper alloy anvil plates 218, 220, 222 that, in this example, are the same size and shape. The assembly of overlapping sheets 210, 216 is secured for the friction stir welding by a suitable fixture or clamping means, not shown. In FIG. 6, the anvil plates 218, 220, 222 extend beyond the edges 212, 214 of the sheets 210, 216. In this example, a stack of three anvil plates 218, 220, 222 is employed. However, a single anvil plate, or a different number of plates, may be employed to obtain suitable heat dissipation from the friction stir weld site on the thin magnesium and aluminum sheets. Sometimes, for example, greater anvil mass or water-cooling of the anvil plates is desired when friction stir welding operations are continuous and ongoing and the temperature of the anvil may increase.

A friction stir tool 224 with round cylindrical tool body 226 and truncated conical end section 228 carrying a profiled probe 230 is used in making a seam weld. Friction stir tool 224 is gripped in the chuck of a powered friction stir welding machine, not shown, that rotates friction stir tool 224 around a longitudinal axis at the center of round tool body 226, conical end section 228 and axial probe 230. The friction stir machine positions friction stir tool 224 over overlapping sheets 210, 216 with probe 230 directed nearly perpendicularly at upper surface 232 of upper sheet 210. In this example, the friction stir machine rotates friction stir tool 224 as indicated by the curved circumferential arrow in FIG. 6 and presses the end of probe 230 against surface 232 of aluminum alloy sheet 210 as indicated by the vertical arrow.

As rotating probe 230 of friction stir tool 224 is pressed into sheet 210 it plasticizes and stirs the underlying and adjacent aluminum alloy and magnesium alloy sheet material as well as the interposed coating material layer 225. The friction stir probe 230 penetrates through the thickness of aluminum alloy sheet 210 into magnesium alloy sheet 216. In the formation of a seam weld, as is illustrated in FIG. 6, friction stir tool 224 with revolving probe 230 penetrating in the workpiece material is moved in a linear path generally parallel to sheet edges 212, 214 to progressively stir and heat the metal and interposed coating layer engaged by friction stir tool 224. As the rotating friction stir tool 224 is translated along its predetermined path, the stirred, heated, and mixed sheet metal layers and coating material left behind cools and re-hardens. This re-hardened material is illustrated schematically at 234 as a partially formed weld seam. Weld seam 234 comprises mixed elements of the aluminum alloy sheet 210, magnesium alloy sheet 216 and interposed coating layer 225 to form a composite of the parent materials and microstructural constituents, such as $Mg_2Sn$ and $Al_3Mg_2$, formed during welding, providing a strong weld bead. Weld seam 234, incorporating materials from layer 225 including any adhesive that was not burned off during the welding process, is stronger than a seam weld formed only of the original aluminum and magnesium alloy constituents.

In this example, probe 230 penetrates through the thickness of top sheet 210 and into underlying sheet 216 to a predetermined depth. After the rotating friction stir tool 224 has been moved a predetermined length across the overlapping sheets 210, 216, the linear weld seam 234 extends across the width of sheets 210, 216 with the predetermined length.

In this embodiment, a stack of three copper plates 218, 220, 222 are selected to extract excess heat from the friction stir affected region of the assembly of overlapping sheets to avoid or minimize melting of the stir affected material. The thermal conductivity and mass of the three plates (or a different number or size of plates) is predetermined by experiment or other analytical means to facilitate friction stir welding of sheets 210, 216 to obtain the desired performance of the weld and the overlapping sheet assembly.

The above embodiment describes an example of friction stir welding of aluminum sheet to magnesium sheet with the aluminum sheet being on the top (i.e., the entry side of friction stir welding tool 224). In this embodiment high thermal conductivity anvils, such as hard copper alloy or water-cooled steel anvils are used to extract excess heat to maintain adequate temperatures at the welding site to obtain the required performance of the weld and the overlapping sheet assembly.

In another embodiment where the magnesium alloy sheet is on the top and the aluminum alloy is the bottom work piece in contact with the supporting anvil, a steel or a less thermally conductive anvil may be used if the heat extraction capability of the aluminum work piece combined with the anvil is excessive such that the required performance of the weld and the overlapping sheet assembly cannot be obtained. This situation applies to both linear friction stir welding and friction stir spot welding processes described above.

Practices of the invention have been described using certain illustrative examples, but the scope of the invention is not limited to such illustrative examples.

The invention claimed is:

1. A method of forming a friction stir weld between a magnesium-based alloy workpiece and an aluminum-based alloy workpiece, the method comprising:

forming an assembly in which the magnesium-based alloy workpiece and the aluminum-based alloy workpiece have faying surfaces with a faying surfaces weld location at which the friction stir weld is to be formed and one of the workpieces has a surface with a friction stir engagement location for engagement with a rotating friction stir weld tool;

placing an interlayer composition at one or both of the friction stir engagement location or faying surfaces weld location, in which the interlayer composition consists essentially of a mixture of an adhesive and silver, tin, and zinc as powder; and friction stirring the magnesium-based alloy workpiece and the aluminum-based alloy workpiece with a friction stir tool that initially engages the friction stir engagement location and penetrates the workpieces to each faying surfaces weld location;

in which the action of the friction stir tool causes mixing of the interlayer composition with metal elements of the magnesium-based alloy workpiece and the aluminum-based alloy workpiece and forms a weld material at the faying surfaces weld location, the inclusion of the interlayer composition in the weld material causing the weld material to increase in viscosity and to form a stronger friction stir weld bond between the magnesium-based alloy workpiece and aluminum-based alloy workpiece than a friction stir weld bond formed between the workpieces without the placement of the materials or material combinations; and in which the action of the friction stir tool also causes at least a portion of the adhesive to cure and to bond the magnesium-based alloy workpiece and the aluminum-based alloy workpiece together.

2. A method as recited in claim 1 in which the assembly is supported on a thermally conductive copper anvil adapted to avoid or minimize melting at the weld location.

3. A method as recited in claim 1 in which the assembly of workpieces has first and second faying surfaces with first and second faying surfaces weld locations, and the same interlayer composition is mixed into the weld material of each of the first and second faying surface weld locations.

4. A method as recited in claim 1 in which the combination of constituents of the interlayer composition with the magnesium and aluminum workpiece constituents increase the melting temperature of the weld material.

5. A method as recited in claim 1 in which the strength of the weld is at least twice that obtained when the workpieces are similarly friction stir welded without the interlayer composition.

* * * * *